March 30, 1965
L. F. HANES ETAL
3,175,939
APPARATUS FOR WELDING THERMOPLASTIC FORMS
Filed Dec. 26, 1961
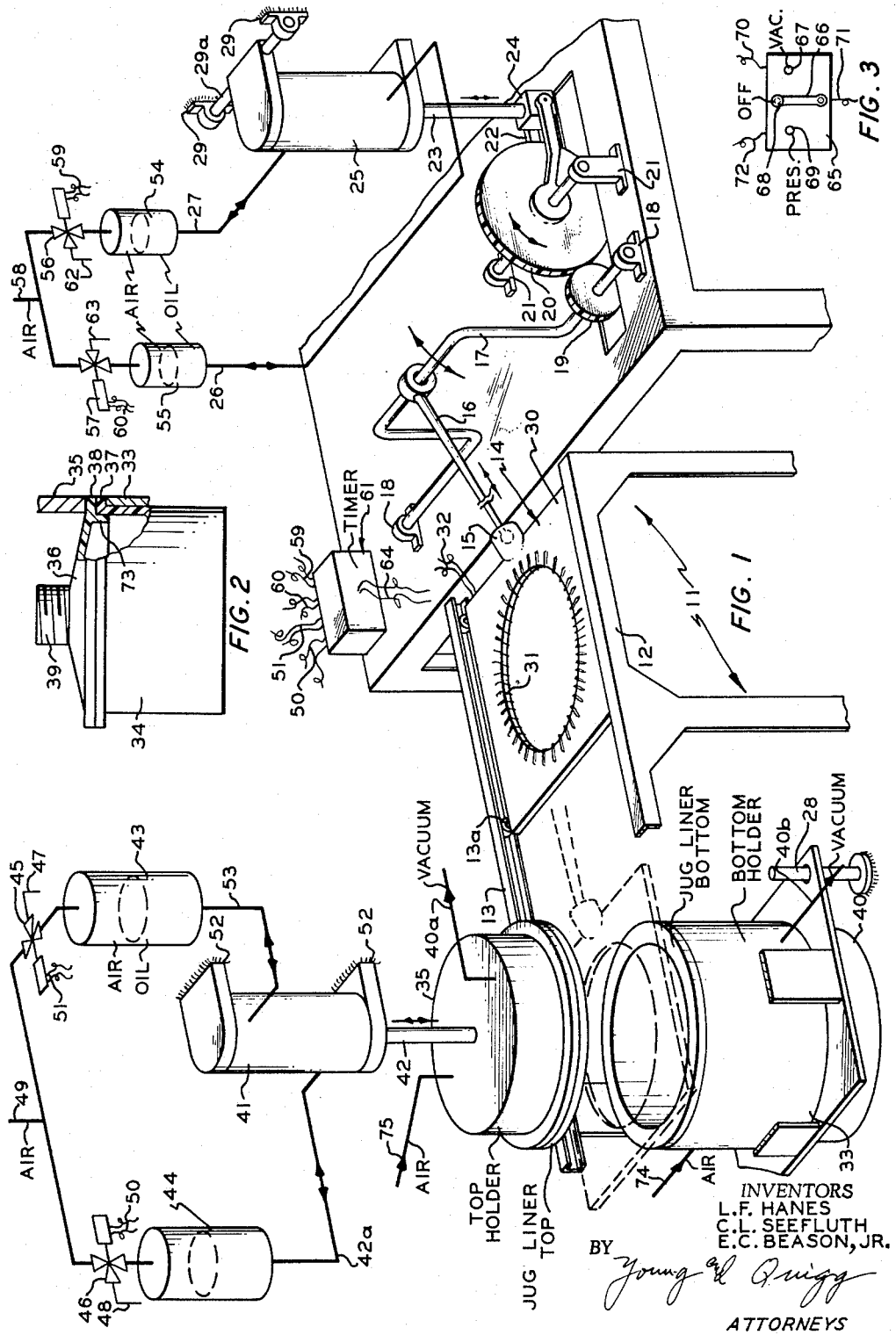
INVENTORS
L.F. HANES
C.L. SEEFLUTH
E.C. BEASON, JR.
BY Young & Quigg
ATTORNEYS

United States Patent Office 3,175,939
Patented Mar. 30, 1965

3,175,939
APPARATUS FOR WELDING THERMO-
PLASTIC FORMS
Lewis F. Hanes, Charles L. Seefluth, and Elmer C.
Beason, Jr., all of Bartlesville, Okla., assignors to
Phillips Petroleum Company, a corporation of
Delaware
Filed Dec. 26, 1961, Ser. No. 161,938
7 Claims. (Cl. 156—499)

This invention relates to heat sealing of injection molded thermoplastic forms. In one aspect it relates to a method and apparatus for sealing together injection molded polyolefin portions of a complete article. In another aspect it relates to a method and apparatus for sealing a lid or top member to a bottom member in the production of a complete article of manufacture.

As is well known in the injection molding art, a complete mold is required. An article, such as a complete bottle having a neck of smaller inner diameter than the inner diameter of the body cannot be injection molded because the inner portion of the mold cannot be withdrawn through the small diameter neck. Hence, a bottle must be made in two parts, the body portion and the top portion including the neck, and these parts heat sealed together.

Many attempts have been made to seal such injection molded parts commercially as on automated lines. Such attempts have included spin welding and conductive plate operations. The latter appears to be the most successful. However, the conductive plate technique has been found to be expensive in that close tolerances and considerable cleaning maintenance of the surfaces to be sealed are required.

To circumvent these disadvantages we have discovered a method and an apparatus for sealing together such injection molded thermoplastic parts as the bottom portion and the top portion of a bottle of any desired size. This discovery involves maintaining the two elements to be heat sealed together at a spaced small distance apart and inserting a special heater between these parts for such a period of time that the surfaces to be sealed together become heated to a sealing temperature. The heater is then removed and the two portions to be sealed are brought together with exertion of some pressure for a sufficient period of time to effect the seal. The portions of the article to be sealed together are injection molded with an exterior rim having a smooth annular surface facing a corresponding smooth annular surface on the other portion of the article. These two smooth annular surfaces on the rims are then held apart from each other a distance of about an inch or two and the special heater is inserted between them. When the smooth annular surfaces become sufficiently heated for sealing purposes, the heater is withdrawn and the two parts brought together with the exertion of sufficient pressure to effect the seal. After the passage of the short period of time, the seal is completed, and the completely sealed article removed from the pressuring apparatus as the completely sealed article of manufacture.

The present invention is adapted to the sealing of such thermoplastic material as polyolefins, for example, polyethylene, polypropylene, mixtures of these two polyolefins, polystyrene, cellulose acetate, polyvinylchloride, and many other thermoplastic materials. Production of a polyethylene suitable for sealing by the method and apparatus of this invention is fully disclosed in U.S. Patent 2,825,721.

In one instance the inner container for a liquid, as for example a water jug, was injection molded in two portions. The top portion contains the neck having exterior threads. The lower portion is the bottom and the cylindrical side walls. Each of these portions was molded with an exterior flange having a smooth surface on the side of the flange facing the other portion. The sealing operation involves heating of these two annular surfaces and pressuring of the heated surface together to effect the seal.

An object of this invention is to provide a method and apparatus for sealing together injection molded thermoplastic forms. Another object of this invention is to provide a method and apparatus for sealing together injection molded polyolefin portions of a complete article. Another object of this invention is to provide a method and apparatus for sealing a lid or top member to a bottom member in the production of a complete article of manufacture. Other objects and advantages of this invention will be realized upon reading the following description which, taken with the attached drawing, forms a part of this specification.

In the drawing FIGURE 1 illustrates, in isometric form, an arrangement of apparatus parts for carrying out this invention. FIGURE 2 is an elevational view, partly in section, illustrating a weld of this invention. FIGURE 3 is a view, diagrammatic in form, of a control apparatus useful with the apparatus of this invention.

In FIGURE 1, the apparatus of this invention is illustrated as supported by a support frame or framework 11. Mounted on this framework is a pair of slide channel irons 12 and 13 positioned parallel to each other and with the open sides of the channels facing each other. These channels provide runways for rollers 13a attached to a heater plate assembly 14 as illustrated. This heater plate assembly 14 is in one instance constructed of a transite board 30 having a circular opening in its center. The inner surface of the transite board defining the opening is provided with electrical heater resistance wire 31 wound as illustrated. Small diameter holes are provided and the wire threaded through these holes and then wound around the periphery of the opening and threaded through the next hole in sequence. Terminal wires 32 extend from winding 31 to a source of electrical current, not shown.

An apparatus is provided for moving this heater plate 14 back and forth along guide channels 12 and 13. This apparatus for moving the heater plate comprises a pitman 16 attached to heater plate 14 by a pivot 15 at one end and at the other end is attached by a bearing to a crank 17. This crank 17 is provided with bearings 18 and with a gear wheel 19. This gear wheel 19 is keyed or otherwise nonrotatably attached to the crank 17. A larger diameter gear wheel 20 is provided in meshing relation with gear wheel 19. Gear wheel 20 is mounted on a shaft which in turn is supported rotatably by bearings 21. To rotate gear wheel 20 through a relatively small arc a U-shaped member 22 is rigidly attached to wheel 20 in any manner desired. At the closed end of the U-shaped member is a pivot 24 to which one end of a piston rod 23 is attached. The other end of piston rod 23 extends into a cylinder 25 provided with a piston, not shown. A pair of oil-air reservoirs 54 and 55 are attached respectively by way of flexible conduits 27 and 26 to opposite ends of the cylinder. The upper end of cylinder 25 is pivoted by a shaft 29a in bearings 29. These bearings are supported in any manner desired. To turn the gear wheel 20 in a clockwise direction the solenoid of a three-way solenoid valve 59 is energized thereby opening this valve for the passage of pressure air from a source, not shown, through conduit 58 into the upper portion of reservoir 54. This pressure air forces oil from this reservoir through conduit 27 into the upper end of cylinder 25 thereby forcing the piston downward and rotating the wheel 20 in a clockwise direction. At the same time as oil enters the upper portion of cylinder 25 above the piston, oil is leaving the cylinder 25 below the piston by way of conduit 26 and enters reservoir 55. Also, at this time the solenoid of a solenoid valve 57 is de-energized which operation opens this valve to vent air pressure from above the oil in reservoir 55 through a vent tube 63. Obviously, when vent 63 is open, then the source of air from conduit 58 is closed by the three-way valve to passage to reservoir 55.

When it is desired to rotate wheel 20 in a counter clockwise direction, the solenoid of valve 57 is energized thereby opening conduit 58 through this valve for passage of air into reservoir 55 thereby forcing the piston in cylinder 25 upward and at the same time oil above the piston exits from the cylinder through conduit 27 into reservoir 54 with the solenoid of valve 56 being de-energized and the vent tube 62 open. Leads 59 and 60 of the solenoids of the valves 56 and 57 are connected with the corresponding leads 59 and 60 of a timer apparatus 61.

At the opposite end of the apparatus illustrated in FIGURE 1 is mounted a bottom holder 33 attached to a base 40.

Above this bottom holder 33 and base 40 are positioned a lid holder 35 attached to the end of a piston rod 42. The other end of this piston rod extends into a cylinder 41 with a piston on the cylinder end thereof, not shown. This cylinder is rigidly attached to supports 52. The working parts of cylinder 41 work in substantially the same manner as those hereinabove described relative to cylinder 25. To move the lid holder 35 downward oil is admitted through a conduit 53 to the space above the piston from an oil reservoir 43. To force this oil into the cylinder, air from a source not shown is admitted through a conduit 49 and passes through a three-way solenoid valve 45 into the upper portion of reservoir 43. At the time oil is flowing from reservoir 43 into the upper portion of cylinder 41 oil flows from below the piston therein through a conduit 42a into an oil reservoir 44. Air from this reservoir at this time exits through a three-way valve 46 by way of vent 48 with the solenoid of this valve being de-energized.

To raise the lid holder 35 it is merely necessary to admit air through conduit 49 and through solenoid valve 46, with its solenoid being energized, into reservoir 44 resulting in passage of oil therefrom through conduit 42a thereby raising the piston. At this time oil leaves the space in the cylinder above the piston through conduit 53 and enters reservoir 43 with air therein being vented through three-way valve 45 and vent tube 47. At this time the solenoid of the solenoid valve 45 is de-energized. The solenoids of valves 46 and 47 are connected by way of electrical leads 50 and 51 to the corresponding leads of timer 61. Electrical current is provided to the timer 61 from a source, not shown, by way of leads 64.

On reference to FIGURE 2 the requirements in the construction of the injection molded apparatus parts and bottom and lid holders are illustrated. A flange 38 is molded on the outer periphery of the lid 36 of the container. At the same time a guide flange 73 is produced on the lid 36 as the means for correctly positioning the lid on the bottom or kettle portion 34 of the container. This bottom or kettle portion 34 of the container is also injection molded with a flange 37 at its upper part as illustrated. The lower surface of flange 38 and the upper surface of flange 37 are provided with smooth and matching surfaces. The top 36 of the container is provided with a neck 39 and threads for closure purposes.

When this container is for use as, for example, a water jug, this entire injection molded and heat sealed item is enclosed within a protective cover such as a metal container. The space between the injection molded inner container and the outer protective container is ordinarily filled with a heat insulating material.

FIGURE 3 of the drawing illustrates in diagrammatic form a switch box 65 provided with contacts 67 and 69 and a neutral position 68. When a switch lever 66 is moved to the right connection is made between lead wires 71 and lead wire 70. When the switch lever 66 is moved entirely to the left connection is made between lead wire 71 and lead wire 72. In the intermediate position the switch lever maintains both the circuits open.

In the operation of this apparatus the bottom portion 34 of the container is positioned within bottom holder 33. Also, the lid member 36 is inserted into the lid holder 35 from its bottom. In this manner the lid 36 with its open end facing downward faces the upper and open end of the bottom portion 34. An elastomeric disc, not shown, is mounted within the lid holder so as to seal, airtight, the space between the outer surface of lid 36 and the inner surface of lid holder 35. When it is desired to carry out the sealing operation, the bottom holder 33 is swung around pivot 28 and the bottom 34 and lid 36 are placed in their respective holders 33 and 35. Vacuum is then applied through conduits 40a and 40b to the spaces between the holders and the forms to be sealed to hold the latter in the holders. The bottom holder is then swung into position beneath the lid holder and lid. At this point the lower end of flange 73 is positioned about a half inch above the heater plate, and the lower surface of the heater plate is about a half inch above the top surface of flange 37 when the heater plate is positioned in its operable heating position. At this time the heater plate 14 is moved from right to left to a position immediately between the surfaces to be sealed. The operation of the cylinder 25 is so carried out that the electrical heater resistance windings 31 are exactly between the annular surfaces to be heated and sealed. After passage of a predetermined length of time required for properly heating these surfaces, this heater plate is then moved from left to right and air is admitted from source 49 into the reservoir 43 resulting in the downward movement of the lid holder 35 to such an extent that the flange 73 enters the bottom portion 34 and the lower surface of flange 38 is pressured against the upper annular surface of flange 37. This pressuring is maintained for a predetermined length of time such as has been found to effect a tight and strong seal between the lid and bottom portions of the container. After passage of this predetermined length of time, the sealed and completed article of manufacture is removed by relieving the vacuum, swinging bottom holder 33 outward and lifting the sealed item from holder 33.

Additional details of the operation include inserting the lid 36 into the lid holder 35 and inserting the bottom of the container into the bottom holder 33, after which steps, switch lever 66 is moved to the right to complete an electrical circuit through conduits 71 and 70. The completion of this circuit applies a vacuum from a source, not shown, through conduits 40b and 40a to spaces respectively between bottom 34 and its container and the lid 36 and its holder. In this manner the bottom of the container and the lid are held securely and properly spaced while the heating and sealing operations are carried out. In order to remove the sealed container from the bottom holder 33 and the lid holder 35, switch lever 66 is moved to the left onto contact 69 thereby opening the circuit previously closed and closing the circuit through leads 71 and 72 so as to apply a small air pressure from a source, not shown, through conduits 74 and 75 to the abovementioned spaces between the sealed portions of the container and the bottom and lid holders. By applying a slight air pressure, such as, for example, ¼ to ½ pound of air pressure, the sealed container is easily removed from both the bottom holder 33 and the lid holder 35. As soon as the sealed container is loosened from both holders, the switch lever 66 is moved back again to its neutral position.

The timer apparatus 61 is illustrated with several pairs of lead wires 50, 51, 59, and 60 leading to the corresponding lead wires of the several solenoid valves. This timer can be set to maintain the heater plate 14 in the operable heating position for a predetermined length of time, to then remove the heater from the heating position, and to automatically lower the lid holder 35 into a sealing position for a predetermined length of time. Also, after passage of this latter predetermined length of time, the lid holder is raised and the air pressure can be manually or automatically admitted for final removal of the sealed article. Details of this timer 61 are not illustrated herein because such timer apparatus is available from instrument supply houses and the operation and operable assembly thereof are well understood by those skilled in the instrumentation art.

In one instance such a machine as the one herein described operated very satisfactorily producing sealed joints in less than a minute of elapsed time. In this instance the heating time of the surfaces to be heat sealed was 14 seconds, the clamping or pressuring time actually effecting the seal was 10 seconds. The machine cycle time, that is, the length of time for inserting the two members to be heat sealed, and removing of the sealed item required 24 seconds.

The length of the heating portion of the cycle is determined so as to give a proper seal, various thermoplastic materials requiring different heating times. Ordinarily the heating coil 31 is turned on and left on during all portions of the cycle. In other words it is turned on and remains on until the day's work or all of the vessels desired to be sealed, are sealed.

To illustrate the effectiveness and the efficiency of this apparatus in this operation a one-gallon water jug was injection molded of a linear, high density polyethylene into two portions, as, for example, lid 36 and bottom portion 34. These two members were provided with flanges and annular surfaces thereon for sealing as illustrated in FIGURE 2. The flange surfaces to be sealed were heated to a temperature between 265° and 325° F. by an electrical resistance wire maintained at about 1600° F. for about 14 seconds. After sealing the lid to the bottom portion by the apparatus herein described the sealed and completed jugs were tested at 21 pounds per square inch gauged air pressure before the jugs failed. Even after jug rupture occurred the sealed joints were still completely intact. In other words, failure occurred at other places than at the seal.

Jugs made by sealing such lids to such bottom portions by the prior art conductive plate method failed at 15 pounds pressure per square inch with the seals being the point of failure.

While various suitable types of electrical resistance heating elements can be used and various elements are heated to various temperatures by passage of electrical current therethrough, the length of time the heating element is maintained in the operable material heating position will vary according to the temperature of the heating element and particular thermoplastic material being heated.

As is apparent, the apparatus disclosed and described herein can be easily adapted to semi-automated or fully automated operations as desired. The semi-automated system is or can in one instance be the operation as herein described with the manual insertion of the container lid and container bottom into the two holders along with the manual operation of the vacuum and pressure switch lever 66. The remainder of the operation described herein is automatic with timer 61. The operation can be completely automatic or automated by providing a plurality of bottom holders 33 and lid holders 35 around the prepihery of wheels with the bottom and lids being automatically positioned in the respective holders and the completed, sealed jug automatically removed from the holders. Also, this apparatus is adapted to a linear conveyor system as well as to the rotary or turntable type just mentioned.

While we have described the construction and operation of our apparatus as adapted to sealing the lid onto a bottom portion of the container, it is obvious that with only slight modifications within the skill of the art this machine and method are adapted to sealing other types of injection molded thermoplastic materials for the production of other types of articles of manufacture.

While certain embodiments of the invention have been described for illustrative purposes, the invention obviously is not limited thereto.

We claim:

1. A heater comprising an electrically nonconducting, heat resistant plate, an opening in said plate, the edge of said plate defining said opening having the general shape of a surface to be heated, a plurality of spaced openings through said plate at uniform distances from said edge, and an electrical resistance heater wire threaded alternately through said openings and over said edge in such a manner as to produce a coil extending circumferentially around said edge defining said opening so as to form heating surfaces on both sides of said plate adjacent said opening.

2. A heater comprising an electrically nonconducting, heat resistant plate, a circular opening in said plate, the diameter of said opening being substantially the same as the diameter of an element to be heated, a plurality of spaced openings in said plate surrounding said circular opening, an electrical resistance heater wire threaded through the plurality of openings around said circular opening in such a manner as to form a coil around the circular edge of said plate defining said circular opening so as to form heating surfaces on both sides of said plate adjacent said opening.

3. An apparatus comprising, in operable combination, first means supporting one portion of a thermoplastic form, second means supporting another portion of said thermoplastic form to be heat sealed to said one portion along opposed annular sealing surfaces, said first means supporting one portion of said form and said second means supporting another portion of said form being positioned along a common, vertically positioned axis, said first means being positioned above said second means with said annular surfaces facing each other, said first means being reciprocably movable along said axis, third means attached to said first means to reciprocate same, a heater constructed in accordance with claim 1, fourth means positioned to move said heater into heating position intermediate the surfaces of said portions of form to be sealed and to withdraw said source of heat.

4. An apparatus comprising, in operable combination, first means supporting one portion of a thermoplastic form, second means supporting another portion of said thermoplastic form to be heat sealed to said one portion, said first means supporting one portion of said form and said second means supporting another portion of said form being positioned along a common vertically positioned axis, said first means supporting one portion of form being positioned above said second means supporting another portion of form with corresponding surfaces of the portions of thermoplastic form to be sealed together facing each other, said first and second means being containers so shaped as to be fully closed when the respective portions of thermoplastic form are positioned therein in sealing position, vacuum producing means communicating with each of said first and second means for retaining said portions of form in sealing positions therein, air pressure producing means also in communication with said first and second means for pressuring said portions of thermoplastic form from said first and second means subsequent to sealing said portions together, said first means being reciprocably movable along said axis, third means attached to said first means to reciprocate same, a source of heat, fourth means positioned to move said source of heat into heating position intermediate the surfaces of said portions of form to be sealed and to withdraw said source of heat.

5. In the apparatus of claim 4, a timer, said timer being connected with said third means and with said fourth means to regulate operation of same whereby said timer upon energizing said third means and moving said first means to a position sufficiently remote from said second means that the surfaces of said portions of form to be sealed are positioned a predetermined distance apart, and while at said position said timer energizing said fourth means thereby moving said source of heat to a position intermediate said surfaces to be sealed, and after a predetermined residence in this position said timer further energizes said fourth means thereby withdrawing said source of heat and further energizing said third means and moving said first means toward said second and thereby contacting the surfaces of said portions of thermoplastic form to be sealed together.

6. An apparatus comprising, in operable combination, first means for supporting one portion of a thermoplastic form, second means for supporting another portion of said thermoplastic form to be heat sealed to said one portion, said first and second means being positioned so as to have a common axis, one of said means being reciprocably movable along said axis, third means attached to said one of said means for reciprocably moving same, heating means for heating adjacent surfaces of plastic forms held by said first and second means, said heating means comprising an electrically nonconducting refractory plate having an opening therein, the edge of said plate defining said opening being the general contour of the surfaces of the forms to be heat sealed, an electrical heating element along an annular section of said plate at said edge having heating surfaces on both sides of said plate, guide means for said heating means directed perpendicular to said axis in a plane intermediate said first and second means, reciprocable means attached to said heating means for moving same along said guide means alternately into and out of position intermediate said first and second means, and means for reciprocating said reciprocable means.

7. The apparatus of claim 3 including guide means for said heater in a horizontal plane passing intermediate said first and second means, rollers positioned on the opposite edges of the heater plate, said guide means comprising parallel channels supporting said rollers.

References Cited in the file of this patent

UNITED STATES PATENTS

| | | |
|---|---|---|
| 1,119,838 | Kuhn | Dec. 8, 1914 |
| 1,600,675 | Kaye | Sept. 21, 1926 |
| 2,379,500 | Steffens | July 3, 1945 |
| 2,384,014 | Cutter | Sept. 4, 1945 |
| 2,409,954 | Pearson | Oct. 22, 1946 |
| 2,455,461 | Anderson | Dec. 7, 1948 |
| 2,492,908 | Von Hofe | Dec. 27, 1949 |
| 2,581,977 | Spalding et al. | Jan. 8, 1952 |
| 2,665,738 | Caskin | Jan. 12, 1954 |
| 2,708,648 | Ulmschneider | May 17, 1955 |
| 2,736,065 | Wilcox | Feb. 28, 1956 |
| 2,802,086 | Fener | Aug. 6, 1957 |
| 2,816,595 | Hudak | Dec. 17, 1957 |
| 2,833,683 | Quandt | May 6, 1958 |
| 2,868,942 | Lyijynen | Jan. 13, 1959 |
| 2,961,363 | Lowes | Nov. 22, 1960 |
| 3,013,925 | Larsen | Dec. 19, 1961 |